United States Patent [19]
Hakim-Elahi

[11] Patent Number: 5,251,689
[45] Date of Patent: Oct. 12, 1993

[54] ROLLABLE HEAT EXCHANGER

[75] Inventor: Parviz Hakim-Elahi, Wilhelmsburg, Austria

[73] Assignee: Solkav Solartechnik Gesellschaft m.b.H., Wilhelmsburg, Austria

[21] Appl. No.: 638,499

[22] Filed: Jan. 7, 1991

[30] Foreign Application Priority Data

Jan. 5, 1990 [AT] Austria ..................... A22/90

[51] Int. Cl.$^5$ ............................................. F28F 3/12
[52] U.S. Cl. ........................................ 165/46; 165/56; 165/905; 165/49; 165/171; 62/235
[58] Field of Search ............... 165/46, 49, 56, 171, 165/905; 62/235

[56] References Cited

U.S. PATENT DOCUMENTS

| | | | |
|---|---|---|---|
| 2,073,023 | 3/1937 | Obrecht | 165/56 |
| 3,751,935 | 8/1973 | MacCracken et al. | 165/46 |
| 3,893,507 | 7/1975 | MacCracken et al. | 165/46 |
| 4,112,921 | 9/1978 | MacCracken | 165/46 |
| 4,270,596 | 6/1981 | Zinn et al. | 165/46 |
| 4,294,078 | 10/1981 | MacCracken | 165/18 |
| 4,354,546 | 10/1982 | Zinn | 165/46 |
| 4,394,817 | 7/1983 | Remillard | 165/46 |
| 4,703,597 | 11/1987 | Eggemar | 165/171 |
| 4,817,707 | 4/1989 | Aoyama et al. | 165/46 |
| 4,880,051 | 11/1989 | Ohashi | 165/46 |
| 4,941,528 | 7/1990 | Herbst | 165/46 |
| 4,979,373 | 12/1990 | Huppee | 165/171 |

FOREIGN PATENT DOCUMENTS

| | | | |
|---|---|---|---|
| 0023043 | 1/1981 | European Pat. Off. | 165/49 |
| 0130502 | 1/1985 | European Pat. Off. | |
| 0210285 | 2/1987 | European Pat. Off. | |
| 2624868 | 12/1977 | Fed. Rep. of Germany | |
| 2915975 | 10/1980 | Fed. Rep. of Germany | 165/46 |
| 3100386 | 8/1982 | Fed. Rep. of Germany | |
| 3100403 | 8/1982 | Fed. Rep. of Germany | 165/46 |
| 3203428 | 9/1983 | Fed. Rep. of Germany | 165/56 |
| 2831591 | 11/1984 | Fed. Rep. of Germany | |
| 3609186 | 9/1987 | Fed. Rep. of Germany | |
| 3643668 | 5/1988 | Fed. Rep. of Germany | |
| 1029954 | 12/1950 | France | 165/56 |
| 1586890 | 7/1970 | France | |
| 0203369 | 10/1983 | German Democratic Rep. | 165/46 |
| 0095134 | 6/1983 | Japan | 165/46 |
| 8100527 | 9/1982 | Netherlands | 165/171 |
| 380105 | 4/1985 | Netherlands | |

*Primary Examiner*—John K. Ford
*Attorney, Agent, or Firm*—Henry M. Feiereisen

[57] ABSTRACT

A rollable heat exchanger includes parallel fluid-carrying passageways which are connected with each other by elastic webs. Attached to the passageways-near side of the webs is a filler material which flatly covers the passageways and is of flexible, elastic composition so as to allow coiling of the heat exchanger. Thus, the heat exchanger can be used for a wide range of applications, in particular for covering a surface and/or bridging hollow spaces, especially sporting surfaces and recreational surfaces.

7 Claims, 1 Drawing Sheet

ROLLABLE HEAT EXCHANGER

BACKGROUND OF THE INVENTION

The present invention refers to a heat exchanger and use thereof.

From the U.S. Pat. No. 4,294,078, there is known a heat exchanger with a rolled-up flexible tubing mat which carries a heat transfer medium and a mat of rubberized horsehair which covers the tubing and assumes the function of spacer means for the individual convolutions of the rolled-up tubing mat. This matting of rubberized horsehair is disposed at the highest cross sectional point of the tubing, and thus does not fill the spaces therebetween. Heat exchangers of this type are used in form of a roll within a tank filled with a phase change material which changes its phase between solid and liquid within the operating temperature range for the heat exchanger. Depending on the direction of the phase change, great quantities of heat are either released or bound during the phase change.

German publication DE-OS 36 43 668 discloses an apparatus for storing and/or transferring heat, with at least one conduit for a heat transfer medium guided and supported in or at a base body which includes at least an external surface for the heat transfer between the surrounding and a heat transfer medium and is designed as weblike or mat-like rollable material. The base body includes at least one layer of a concrete-like, at least partly polymer containing material by which the conduit is guided and is in heat-conducting contact therewith, with the external surface, which is provided for the heat transfer, being partly formed by this layer. An external surface of the base body may also be covered by a layer of heat insulating material. Since the base body is rollable, the integrated conduits are made of a plastic material of suitable elasticity. The cement-polymer concrete can be imparted with a quasi rubber-elastic behavior so as to be adaptable to randomly geometric shapes. The apparatus according to DE-OS 36 43 668 can be used as heating element or cooling element; however, is not suitable for walking thereupon. The concrete-type material shows good bonding properties for enhancing the connection between the structural elements for attaining larger structural elements. The favorable bonding properties of this known apparatus are also supposed to facilitate the covering with tiles.

SUMMARY OF THE PRESENT INVENTION

It is an object of the present invention to provide an improved heat exchanger obviating prior art drawbacks and allowing use thereof for a wide range of applications.

This object and others which will become apparent hereinafter are attained in accordance with the present invention by providing a rollable heat exchanger with parallel passageways for circulation of a heat transfer medium which are elastically connected by webs and by applying a filler material of flexible, elastic composition to the webs at the passageway-near side thereof for flatly covering the passageways without interfering with the rolling action of the heat exchanger to thereby allow use of the heat exchanger for covering a surface and/or for bridging hollow spaces and to be usable in particular as sports ground and recreational surface.

Preferably, the filler extends beyond the cross sectional area of the passageways for flatly covering the latter.

By filling the spaces between the passageways above the webs with the flexible filler material and by extending the filler material beyond the passageways by a few millimeters so as to rise above the passageways, it is possible to utilize areas, which to date were solely used for accommodating the heat exchanger in form of a solar collector, simultaneously for other purposes, e.g. as surface for tennis, volleyball or other games, or as lawn for sunbathing without requiring special covering works for the passageways after installation of the heat exchanger. Additionally, the heat exchanger can be used for bridging hollow spaces or for covering facades. The webs by which the passageways are mechanically connected provide sufficient strength and shape stability of the thus spread out mat.

According to a further feature of the present invention, an insulating layer is attached to the passageway-distant side of the webs in opposition to the filler material. The exposed, free surface of the insulating layer is preferably flat. By means of the insulating layer, a heat exchange between the fluid within the passageways and the base upon which the mat is rolled out is avoided.

Preferably, the heat exchanger in accordance with the present invention includes two circulation systems which are selectively supplied with a heat transfer medium e.g. water, or with a coolant e.g. brine. In this manner, the heat exchanger can be operated to heat a swimming pool in summer, with the heat exchanger working as a solar plant, while in winter, the same area or surface of the heat exchanger can be used as ice rink and at the same time for a different activity such as tennis, volleyball or other ball games. Certainly, the area can also be used for recreational purposes.

In case the heat transfer medium is intended to flow through one circulation system and the coolant is intended to flow through the other circulation system, it is preferred to alternatingly arrange the passageways of both circulation systems.

The heat exchanger in accordance with the present invention provides a surface which can be used threefold, that is alternatingly as ice skating rink or as heating surface for the heat transfer medium flowing through the passageways in summer and as effective surface for sporting events, such as ice skating, ball games and for recreation.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 1:
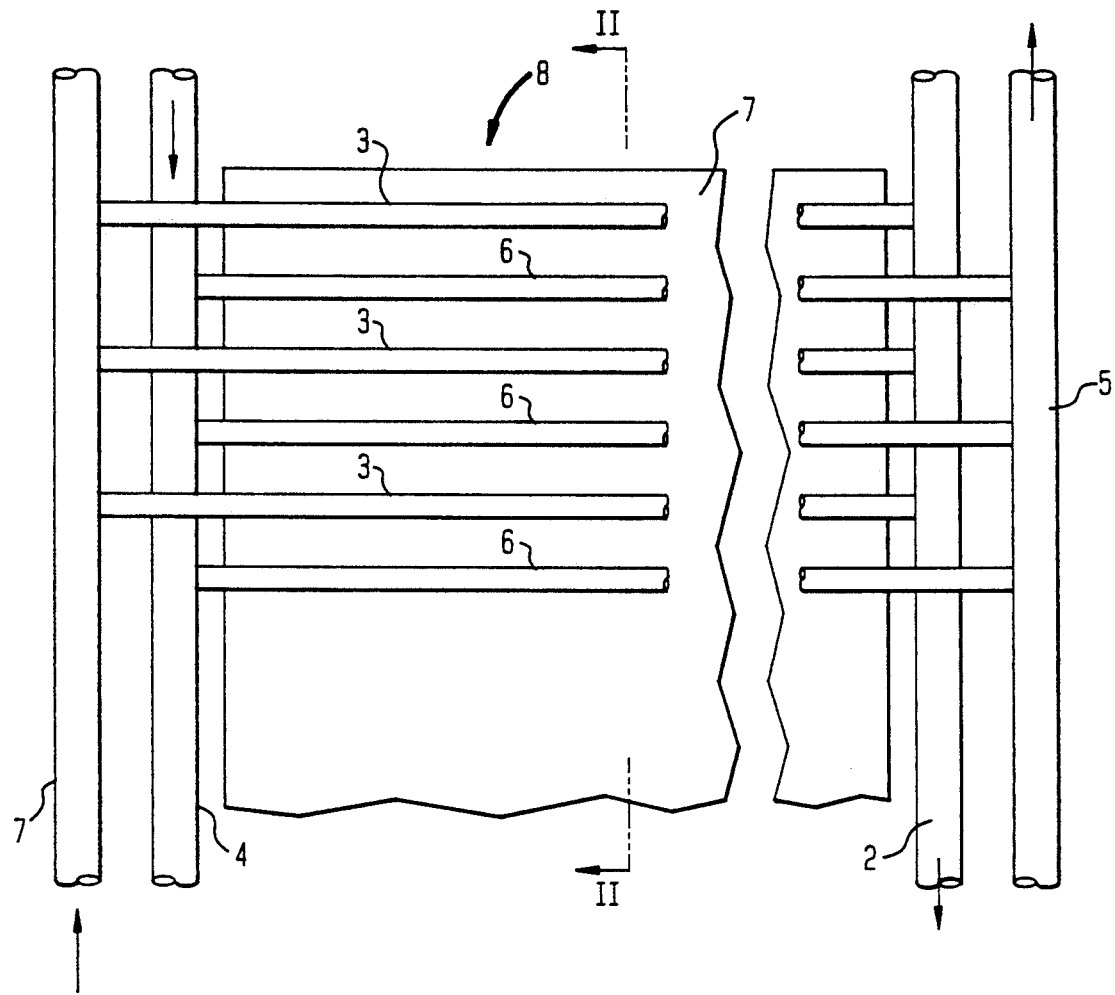
FIG. 1 is a schematic, fragmentary connecting plan of a heat exchanger in accordance with the present invention.

Referring now to the drawing, and in particular to FIG. 1, there is shown a schematic, fragmentary connecting plan of a heat exchanger in accordance with the present invention, with the heat exchanger generally designated by reference numeral 8. The heat exchanger 8 includes a feed pipe 1 for the heat transfer medium for generating heat energy and a drain pipe 2 for the heat transfer medium which is heated by solar energy. Parallel passageways or conduits 3 in form of tubes or pipes connect the feed pipe 1 and the drain pipe 2 for providing a first circulation system for the heat transfer medium. The feed pipe 1 and the drain pipe 2 are in communication with a heat circuit for providing warm water, e.g. water of a swimming pool, with the water of the swimming pool being directly utilized for heating. Thus, no intermediate heat transfer medium is required to flow through the heat exchanger 8.

The coolant such as brine is supplied via a feed pipe 4 and is drained through a drain pipe 5. Parallel passageways or conduits 6 in form of tubes or pipes connect the feed pipe 4 and the drain pipe 5 for defining a second circulation system through which the coolant flows. The feed pipe 4 and the drain pipe 5 are in communication with the refrigeration cycle of a refrigerator (not shown) by which the coolant such as subcooled brine is supplied to the second circulation system Preferably, as can be seen from FIG. 1, the passageways 3 for the heat transfer medium and the passageways 6 for the coolant are alternatingly arranged.

Figure 2:
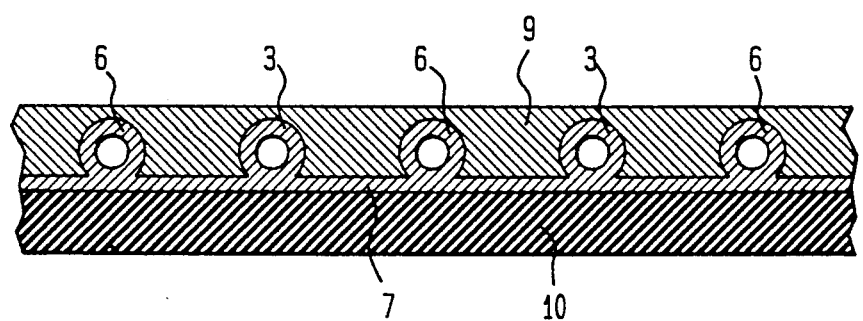
FIG. 2 is a sectional view of the heat exchanger taken along the line II—II in FIG. 1.

As shown in FIG. 2 which is a sectional view of the heat exchanger taken along the line II—II in FIG. 1, the passageways 3, 6 are mechanically connected by webs 7 which parallel the longitudinal axis and are externally mounted approximately tangential to the passageways 3, 6 to thereby create a mat-like and frost-resistant heat exchanger 8. The webs and the passageways define a flat surface on a passageway-distant side of the webs and a corrugated surface on a passageway-near side of the webs with the passageways defining crests of the corrugated surface.

The passageways 3, 6 are embedded in a filler material 9 which bears upon the webs 7 and is of flexible, elastic composition. The filler material 9 extends slightly beyond the cross sectional area of the passageways 3, 6, e.g. by a few millimeters, and flatly covers the passageways 3, 6 so as to be usable as surface or bridge of hollow spaces. Mounted to the passageways-distant side of the webs 7 in opposition to the filler material 9 is an insulation 10, with its exposed surface being preferably flat. The filler may be made of a material of fine grain consistency to have good heat conducting characteristics such as e.g. an elastomer, such as ethylene-propylene terpolymer (EPDM or EPT) embedded in polyurethane. The insulation may be made of a material of coarse grain consistency to include large air pockets for attaining good heat insulation characteristics such as e.g. an elastomer or rubber (recycled tires) admixed with polyurethane. As clearly illustrated in FIG. 2, the filler material 9 and the insulation 10 constitute separate layers, with the filler material 9 embedding the passageways 3, 6 and having good heat conducting characteristics to permit heat transfer while the material for the insulation 10 is suitably selected to essentially prevent or at least reduce such a heat transfer.

When running the heat exchanger 8 during summer months, the heating cycle via the feed pipe 1 and the drain pipe 2 is operated, with the refrigeration cycle being shut off, while during winter months the refrigeration cycle via the feed pipe 4 and the drain pipe 5 is operated, with the heating cycle being shut off.

Preferably, the passageways 3 have an inner diameter of about 7 mm and a wall thickness of 1.6 mm. The passageways 6 can be dimensioned in a same manner as the passageways 3; however, they may also be of smaller inner diameter such as 5.2 mm at a slightly greater wall thickness of e.g. 1.7 mm. The thickness of the webs may be 1.8 mm.

While the invention has been illustrated and described as embodied in a heat exchanger, it is not intended to be limited to the details shown since various modifications and structural changes may be made without departing in any way from the spirit of the present invention.

What is claimed as new and desired to be protected by Letters Patent is set forth in the appended claims:

1. A rollable heat exchanger comprising:
   flexible passageway means, including parallel flexible passageways for circulation of a fluid;
   elastic connecting means including webs for continuously linking adjacent parallel passageways over a substantial portion thereof;
   said webs and said flexible parallel passageways defining a flat surface on a passageway - distant side of said connecting means and a corrugated surface on a passageway - near side of said connecting means wherein said flexible parallel passage ways define crests of said corrugated surface;
   a filler formed as a separate layer which is attached to said passageway-near side of said connecting means for embedding said passageway means, said filler being made of flexible, elastic heat conducting material for allowing the unimpeded rolling up of the heat exchanger and for selective use of the heat exchanger for covering a surface and for bridging hollow spaces for use as a sports ground and recreational surface; and
   an insulator of heat insulating material and formed as a further separate layer for insulating said passageway means, said insulator having an inner flat surface attached to said passageway-distant side of said connecting means in opposition to said filler.

2. A rollable heat exchanger as defined in claim 1 wherein said filler extends beyond the cross sectional area of said passageway means for flatly covering said passageway means.

3. Use of a rollable heat exchanger as defined in claim 2 wherein said insulator has an exposed flat surface.

4. A rollable heat exchanger as defined in claim 1 wherein said passageway means includes a first fluid-carrying circulation system and a second fluid-carrying circulation system for selectively supplying a heat transfer medium and a coolant.

5. A rollable heat exchanger as defined in claim 4 wherein said heat transfer medium is water.

6. A rollable heat exchanger as defined in claim 4 wherein said coolant is brine.

7. A rollable heat exchanger as defined in claim 4 wherein said first circulation system has passageways for allowing circulation of said heat transfer medium and said second circulation system has passageways for circulation of said coolant, said passageways of said first circulation system and said passageways of said second circulation system being alternatingly arranged within said rollable heat exchanger.

* * * * *